Aug. 28, 1934.  C. A. HOXIE  1,971,818
FREQUENCY AND LOAD CONTROL OF ALTERNATING CURRENT SYSTEMS
Filed Sept. 11, 1931  2 Sheets-Sheet 2
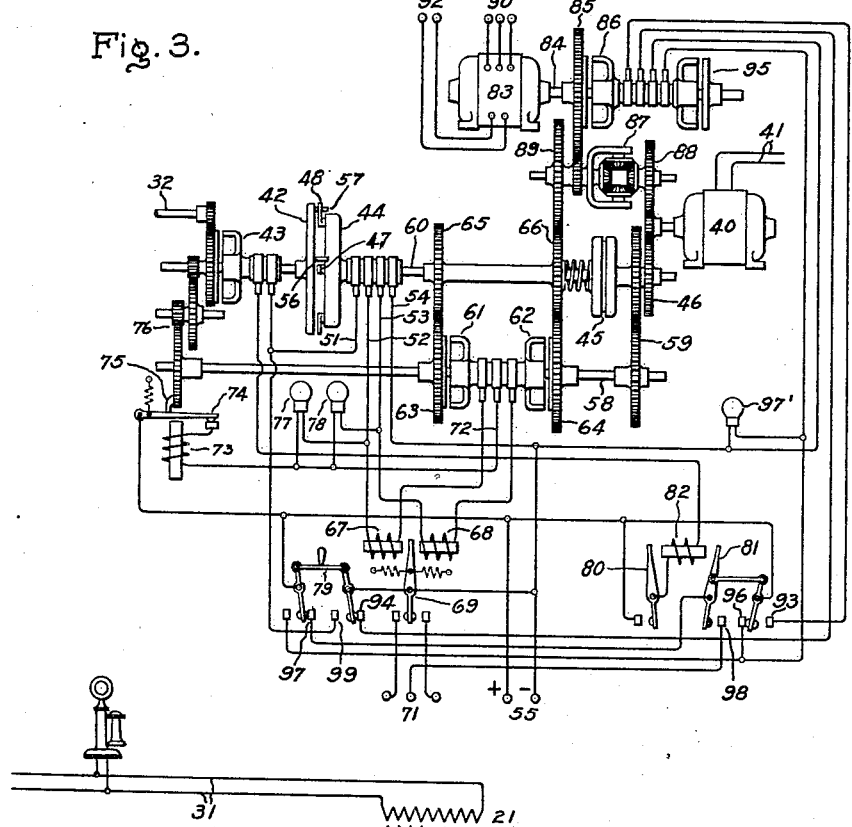
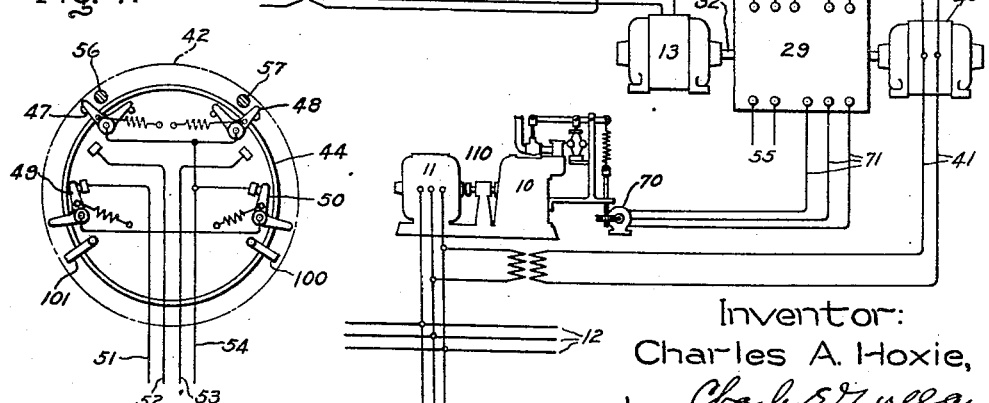
Inventor:
Charles A. Hoxie,
by *Charles E. Mullen*
His Attorney.

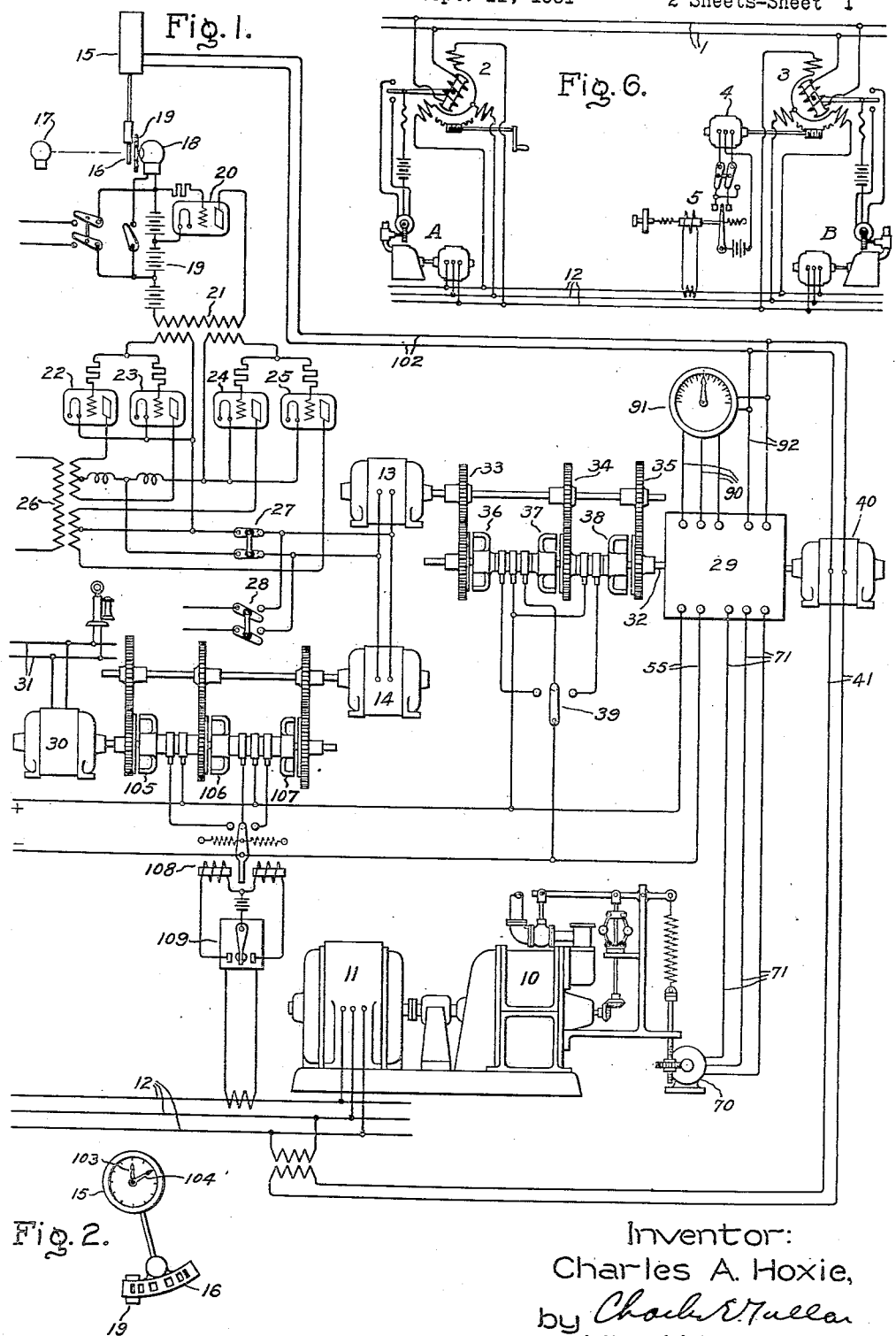
Aug. 28, 1934.  C. A. HOXIE  1,971,818
FREQUENCY AND LOAD CONTROL OF ALTERNATING CURRENT SYSTEMS
Filed Sept. 11, 1931  2 Sheets-Sheet 1
Inventor:
Charles A. Hoxie,
by Charles E. Muller
His Attorney.

Patented Aug. 28, 1934

1,971,818

UNITED STATES PATENT OFFICE 1,971,818

FREQUENCY AND LOAD CONTROL OF ALTERNATING CURRENT SYSTEMS

Charles A. Hoxie, Alplaus, N. Y., assignor to General Electric Company, a corporation of New York Application September 11, 1931, Serial No. 562,344

13 Claims. (Cl. 171—119)

My invention relates to a method and apparatus for controlling the frequency and load of alternating current power generating apparatus and the distribution of load between different units or stations of alternating current power systems. The apparatus may be automatic in its operation in which case it is provided with facilities whereby the automatic operation may be supplemented with manual control for the purpose of changing the load conditions and in cases where the load changing conditions are rapid and abnormal the operation of the automatic control is preferably suspended. The primary purpose of the apparatus is to provide reliable and accurate load control apparatus adaptable to present day conditions where large power stations are connected through and supply a common distribution system. The apparatus is also useful in maintaining the system frequency within limits which permit the accurate distribution of time through the use of synchronous motor driven secondary clocks.

In carrying my invention into effect I employ a standard of frequency with which the frequency of the power system is compared. The standard frequency may be determined for example, by an accurate pendulum clock controlling a photoelectric cell and vacuum tube generating apparatus for producing the standard frequency. In the modification described in detail a synchronous motor operated from this standard frequency is compared to the speed of a second synchronous motor supplied from the system to be controlled. Speed correcting control apparatus is operated in accordance with any differences between the standard and system frequencies. An important aspect of my invention is in providing means whereby the comparison relationship between the standard frequency or a standard speed proportional thereto and the power system frequency may be modified by a predetermined amount and direction either manually or automatically to any desired extent for the purpose of controlling the load on a power station as a whole, or the distribution of load between different power generating units or power stations of the same system without disturbing the primary standard or the other automatic control features.

The features of my invention which are believed to be novel and patentable will be pointed out in the claims appended hereto. For a better understanding of my invention reference is made in the following description to the accompanying drawings, Fig. 1 of which represents a primary control power station with the control apparatus of my invention associated therewith; Fig. 2 is a face view of the master clock employed in Fig. 1 for establishing a primary standard frequency; Fig. 3 represents one form of speed comparing mechanism which may be employed in my invention for producing corrective current impulses for controlling speed and frequency; Fig. 4 is a diagrammatic side view of the rotary contact making device used in initiating the corrective current impulses in the apparatus of Fig. 3; Fig. 5 represents a second power station connected to the power station of Fig. 1 over a tie line 12 together with means for controlling the station of Fig. 5 in accordance with the tie line load. In Figs. 1 to 5 inclusive one form of apparatus for carrying the invention into effect has been represented in some detail. Fig. 6 is included to represent the basic principles involved and details which may be desirable in the practical use of the invention have been omitted.

Before going into details it will be helpful to refer to Fig. 6 for an understanding of the main features underlying the present invention and this figure may be taken as a simplified embodiment thereof. A and B represent alternating current generating units or stations presumably located many miles apart but which may be connected together through a tie line 12, and in general, representing the interconnection of alternating power systems of modern times. In such a system it is desirable to control the tie line load when the stations are interconnected. When not connected it is desirable to be able to control their frequencies so that they may be synchronized and connected as and when desired. Whether connected or not, it is desirable to control their frequencies so that time may be distributed over the entire system or systems by means of the well-known synchronous motor driven secondary clock. To this end the frequencies of all stations are controlled by comparison either directly or indirectly to a standard or base frequency. Such standard frequency may be distributed to the various stations by wireless or by telephone wires from a central point and amplified and converted to the most useful form at the localities where used. In Fig. 6 it is assumed that the pilot wires indicated at 1 running between the stations is supplied or controlled from such base frequency source so that it represents and is strictly proportional to some standard frequency which remains fixed. To simplify matters it will be assumed that the standard frequency of the lines 1 is 60 cycles and that the controlled power systems supplied by stations A and B are 60 cycle systems. At stations A and B there are provided frequency comparing devices 2 and 3 by means of which the generated frequencies of these stations may be compared to the standard frequency. As represented, these comparing devices comprise 3-phase stator elements and single-phase rotor elements connected to the power and standard systems respectively. The rotors will therefore rotate or shift their phase angular position with respect to the stators in accordance with any difference in frequency or phase angle shift between the power and standard systems. It will be understood that the frequency difference or error here referred to is an accumulated error in integrated frequency and that the instantaneous frequency error is in general too small to be detected by ordinary frequency meters. The comparing device at 2 has its stator adjustable by hand and controls the contacts of a reversible pilot motor connected so as to vary the speed of the generating apparatus at station A, tending to maintain its frequency fixed with respect to the standard frequency. By shifting the stator element of the comparing device the comparing relationship may be varied and load may be shifted to or from other units or stations similarly controlled by thus changing the frequency comparing relationship. The comparing device 3 of station B controls the speed of the generating apparatus thereat but the comparing relationship is changed in accordance with the tie line load through a reversible motor 4 controlled by a contact-making device 5 in accordance with the tie line load or current. It is contemplated that the contact device 5 may also be operated by hand to adjust the frequency of station B when the tie line is disconnected or in emergency conditions when the tie line is closed. The contact device 5 may be set to hold any desired magnitude of the tie line load in either direction between stations A and B. Let us assume it is set to hold a certain value of load flowing from A to B. Let us assume that it is now desired to eliminate a positive accumulated time error in frequency of the power system. The stator of the comparison device 2 is rotated in the proper direction to reduce load temporarily. The device at 3 follows automatically and the entire system is corrected without materially altering the load distribution and this only temporarily. The device 5 may if desired be operated in accordance with a certain output of station B instead of the tie line load and station A may be controlled manually from the indication of the comparing device instead of automatically as shown. In case the two stations are disconnected and it is desired to synchronize them, this can readily be accomplished by adjusting either or both of the frequency comparing devices. Various other control problems having to do with load distribution, synchronizing, and time distribution will occur to those skilled in the art and the control is simplified and stabilized by reason of the comparison to a common standard frequency. These control functions are accomplished without disturbing the standard of frequency and may be accomplished as quickly or as slowly as desired. In the practicable control of the load distribution it is impracticable to hold a fixed phase relation between the standard and system frequencies. A slight time error, which is too small to interfere with accurate time keeping, accumulates incident to the control of load. By making such accumulated error in frequency proportional to load it cannot exceed the allowable limit except in emergencies. The more detailed description of my invention includes means for making the time error, incident to load control, proportional to such load and such other features as are desirable in the practicable application of the invention.

Referring now to Fig. 1 of the drawings I have here represented the essential parts of one modification of my invention as employed in a power station for controlling the speed of the alternating current generating apparatus represented as comprising the steam turbine 10 and synchronous generator 11. While only one generating unit per station is represented it will be understood that a plurality of units may be controlled simultaneously. A tie line 12 is assumed to be connected between the generating apparatus 11 and similar generating apparatus in a distant power station in which control apparatus represented in Fig. 5 is located. The control apparatus of Fig. 1 controls the power station there represented and in conjunction with the apparatus shown in Fig. 5 located at the distant station, controls the tie line load between these stations.

The control apparatus requires for its practicable operation a source of standard frequency for supplying the synchronous motors 13 and 14. While any desired means of generating and controlling a standard fixed frequency may be employed I will describe one means for doing this which has been found satisfactory. Such apparatus comprises a master clock, a photo-electric cell impulse system controlled by the master clock, and a number of vacuum tubes supplied from a suitable source of supply and controlled by the photo-electric impulse system so as to generate a definite fixed standard frequency alternating current. This apparatus is shown in the upper left portion of Fig. 1. It is not necessarily located in the station controlled. The master clock is represented at 15. The details of construction thereof are not shown but for reasons which will hereinafter be explained it may comprise a master clock such as is shown in Figs. 1 and 2 of United States Patent No. 1,502,493, Warren, July 22, 1924. To the pendulum of this clock is attached a screen 16 having a number of openings (see Fig. 2) for periodically cutting off the light from a light source 17 to a suitably screened photo-electric cell 18 or its equivalent. The openings in the pendulum screen are so proportioned and spaced with respect to the cell and a stationary screen 19, that, as the pendulum swings, it allows equally timed light impulses to strike the cell. In the example shown five such impulses will strike the cell for each half oscillation of the pendulum. If we assume a 1 second clock such impulse will therefore occur at the rate of 5 per second. Corresponding current impulses therefore flow through the cell 18 from the battery 19. These current impulses are suitably amplified by means of a vacuum tube 20 and the amplified current impulses flow through the primary of a transformer 21. The switches associated with the control circuit of amplifier 20 shows how the standard impulses may come in over pilot wires instead of from the master clock shown, or how the impulses of the master clock may be sent to other stations.

Four vapor electric discharge tubes 22, 23, 24, and 25 have their grids influenced by the five cycle alternating current voltages induced in the secondary windings of the transformer 21. The tubes are supplied through a transformer 26 supplied with alternating current of some frequency appreciably higher than 5 cycles; for example, 60 cycles. The connections are such that the four tubes 22 to 25 serve to supply five-cycle energy to the lines connected to the motors 13 and 14, tubes 22 and 23 supplying one-half of the 5-cycle wave and the tubes 24 and 25 the other half of such wave. Switches 27 and 28 indicate that the supply to motors 13 and 14 may be shifted to some other standard frequency source than that described or that the standard frequency may be transmitted to other stations. Motor 13 drives one side of the frequency error detector represented at box 29, the details of which are shown in Fig. 3. Motor 14 drives a small generator 30 for supplying a controllable comparison frequency to a distant station over lines 31.

Shaft 32 leading to the frequency error detector 29 may be connected to the standard motor 13 through three sets of gears 33, 34 and 35 controlled by magnetic clutches 36, 37, and 38 by means of the manual control switch 39. With clutch 37 energized, the speed of shaft 32 is the same as that of motor 13. With clutch 36 energized shaft 32 rotates slightly faster, say .5 per cent faster than motor 13, and with clutch 38 energized shaft 32 rotates slightly slower, say .5 percent slower than motor 13. As will be seen, the switch 39 thus comprises manual means for changing the comparison relationship by a definite amount in either direction without disturbing the adjustment of the primary standard which in this case is the clock 15.

Referring now to the comparing device which takes the form of a speed comparing and error detecting apparatus shown in Fig. 3. In this figure 40 represents a synchronous motor connected to the power system supplied by the generator 11 of Fig. 1 through lines 41. The speed of motor 40 is compared relative to the speed of shaft 32 which is driven by the standard speed motor 13 of Fig. 1. The standard speed shaft 32 drives one side 42 of a rotary contact device through a magnetic clutch 43. The other half 44 of this contact device is driven through a friction clutch 45 and gear 46 from the system motor 40. Under normal conditions when the frequency of the control system and the speed of motor 40 is correct the two halves of the contact device 42 and 44 rotate at the same speed in the same direction. Mounted on part 44 are four snap switches 47, 48, 49 and 50, (see Fig. 4). Switches 47 and 48 are normally open when no controlling action is necessary and switches 49 and 50 are normally closed, the latter being limit switches which when opened deenergize magnetic clutch 43 through wire 51 and disconnect the automatic control from further operation. These limit switches are only opened under abnormal conditions which cannot be taken care of by the speed control effected by switches 47 and 48. All of the switches are connected to one side of a source of supply 55 by wire 54. When switches 47 and 48 are closed they respectively close circuits to wires 52 and 53 which will be referred to presently. Suitable slip rings and brushes are provided between the rotary and stationary parts of the circuits.

On part 42 of this contact device is an overhanging pin 56 which first closes switch 47 and then opens switch 49 in case the system motor 40 drives switch part 44 faster than the standard motor drives part 42. A second overhanging pin 57 first closes switch 48 and then opens switch 50 in case the system motor is slow as compared to the standard motor. The system motor 40 also drives a shaft 58 through gears 59 at the same speed as the shaft 60 on which contact mechanism 44 is located when there is no slip of friction clutch 45. Secured to shaft 58 are parts of magnetic clutches 61 and 62. The other portions of these clutches are secured to gear wheels 63 and 64 meshing with gears 65 and 66 respectively secured to shaft 60. When the clutches 61 and 62 are deenergized wheels 63 and 64 rotate freely on shaft 58. Gear 64 is slightly larger than gear 66 so that if clutch 62 is energized shaft 60 will be driven slightly faster than normal and friction clutch 45 will slip. Gear 63 is slightly smaller than gear 65 so that if clutch 61 is energized shaft 60 will be driven slightly slower than normal and friction clutch 45 will slip. The magnetic clutches 61 and 62 are never both energized at the same time, and when either is energized the speed of shaft 60 is determined by the drive through the corresponding magnetic clutch, the friction clutch 45 being designed to slip under such circumstances. As shown on the drawings the fast clutch 62 may be energized through the circuit 53 which is controlled by contactor 48 on the revolving contact device 44 when the speed of shaft 60 becomes slow with respect to the standard speed shaft 32. The slow clutch 61 on the other hand is energized through circuit 52 and contacts 47 when the speed of shaft 60 becomes fast with respect to the standard speed shaft 32. Connected in line 52 between the rotary contact 47 and clutch 61 is the coil 67 of a double-throw control relay and connected in line 53 between rotary contact 48 and clutch 62 is the other coil 68 of the same relay. The armature 69 of the control relay is normally biased to a neutral position but when energized in one direction or the other closes one side of the energizing circuit of a reversible speed control pilot motor 70 associated with the governor of the turbine 10 of Fig. 1 through circuits 71. The energizing circuits containing the electric clutches 61 and 62 and the relay coils 67 and 68 are completed through a common wire 72, a magnetic relay coil 73 and a contact 74 to the other side of source 55. Contact 74 of the relay is closed by a finger 75 on a wheel driven through a suitable gear train 76 from the standard speed shaft 32. This occurs at predetermined short spaced time intervals such for example as every two seconds. If the circuit of coil 73 is otherwise closed in the rotary contact device 44, contact 74 closes its own holding circuit and will remain in the closed position when moved thereto by the finger 75. Otherwise, it will immediately open when the finger passes this point. This contact closing device 75 serves to determine the minimum time interval between correcting current impulses provided any are necessary.

77 and 78 are signal lamps that are connected so as to be energized when corrective impulses are being transmitted through the contacts of the rotary contact device, lamp 77 showing white for example when the speed of the system motor is high and lamp 78 showing blue for example when the speed of the system motor is low.

Switch 79 is a manually operated device used in restoring the apparatus to operating condition after it has disconnected itself after an abnormal condition. 80 and 81 are also switches used in restoring operating conditions. These switches are in the positions indicated when the apparatus is in inoperative condition. In restoring to the operative condition, the switches 80 and 81 are moved by hand into positions where magnetic armatures thereon will be within the influence of a solenoid 82, the holding circuit of which is closed by switch 80. This solenoid is normally in the circuit of the coil of magnetic clutch 43 so that when this circuit is opened at the limit switches 49 or 50 due to an abnormal speed condition, switches 80 and 81 are released and moved to the positions shown.

In the upper right portion of Fig. 3 is a rotary electric signaling transmitter 83 for measuring and transmitting an indication of the magnitude and direction of correction affected by the apparatus. Its shaft 84 may be connected to a gear wheel 85 by a magnetic clutch 86. Gear wheel 85 is in mesh with a gear operated from the central member of a differential 87. One side of this differential is driven in one direction from the system motor 40 through gears 88. The other side of the differential is driven in the opposite direction by gears 66 and 89. When the shaft 60 is being driven through friction clutch 45 and the magnetic clutches 61 and 62 are deenergized, both sides of differential 87 are driven at the same speed and no rotary movement is transmitted to the transmitter 83. However, when corrective impulses are being sent out by the closure of a switch on rotary contact device 44, one or the other of the clutches 61 or 62 are energized and wheel 66 now rotates slower or faster with respect to system motor 40. The relative difference in rotation of the two sides of the differential is thus a measure of the magnitude and direction of the correction, and this measurement is conveyed to the rotary signal transmitter when the clutch 86 is energized. This measurement is proportional to load and the integrated differences in frequency between the standard and system frequencies.

An electric signaling circuit 90 is connected between transmitter 83 and one or more electric signaling receivers 91 (see Fig. 1) located in convenient observation places in the station for the convenience and information of the station operators. The electric signaling system indicated is of the common rotary field alternating current type requiring a source of alternating current which is indicated at 92. The circuit of the magnetic clutch 86 is energized through contacts 93 and 94 of switches 81 and 79 and it will be noted that this circuit is open at 93. A second magnetic clutch 95 has one part secured to the shaft 84 of the signaling transmitter and the other part stationary. When this clutch 95 is energized through contact 96 of switch 81, the rotary part of the transmitter is locked or held stationary. A signal such as a red lamp 97' is connected across the circuit of clutch 95 and indicates the occurrence of energy speed conditions such as will cause the opening of one or the other limit switches 49 or 50 which allows switch 81 to move to the position shown closing the circuit of clutch 95 and opening the circuit of clutch 86.

In connection with switches 79 and 81 it will be noted that contacts 97 and 98 are included between the positive side of source 55 and the middle wire of the speed control motor circuit 71. This wire must be closed at contacts 97 and 98 before the speed control motor can be operated in either direction of rotation. A contact 99 of switch 79 is provided to temporarily close the circuit to magnetic clutch 43 in restoring automatic control. The exact purpose of these switches will be better understood from the description of the operation of the apparatus of Fig. 3 which follows:

It will be assumed that the standard speed shaft 32 and the system motor 40 are in operation and running at normal speed and that the switches 79, 80 and 81 are in the positions shown. Under these conditions the automatic control apparatus is not in condition to function because clutch 43 is deenergized, clutch 86 is deenergized, the shaft of transmitter is locked by clutch 95 and the circuit 71 to the speed control motor 70 is open. At this time part 42 of the rotary circuit controller is being driven by part 44 through 57 resting against a stop 100 or with finger 56 resting against stop 101. Let us assume that finger 56 rests against stop 101. Switch 47 will then be closed and switch 49 open. The first thing that is done in restoring automatic control is to move switch 79 to the right so as to close a circuit from the negative side of source 55 through switch 79 contact 99 to one side of the magnetic clutch 43. This closes a circuit paralleling the circuit to clutch 43 which is now open at contact 49. This clutch circuit is still open at switch 80. Switch 80 is now moved to the right by hand. This completes the energizing circuit of clutch 43 and energizes the holding coil 82 of switch 80 which retains the position to which it has just been moved. At this time clutch 61 as well as relay coil 67 is energized by reason of the fact that switch 47 is closed and switch 73 is closed and held closed by holding coil 73. Nothing happens by reason of the operation of control relay 69 at this time because the circuit of the speed control motor is open at contacts 97 and 98 of switches 79 and 81. However, since clutch 61 is energized shaft 60 will be driven therethrough and will rotate slower than normal thus restoring part 44 of the rotary contact device towards its central position with respect to part 42. This restoring action will first close switch 49 and then open switch 47. As soon as switch 47 opens the two parts of the rotary contact device have been restored to the position represented in Fig. 4 and clutch 61 is deenergized whereupon the two parts of the rotary contact device normally run at the same speed. This fact is indicated to the operator by reason of the fact that the white light 77 which was lit when clutch 61 was energized now goes out. The operator then moves switch 79 to the left to the position shown in Fig. 3 and moves switch 81 to the right where it is retained by the holding magnet 82.

This places the automatic apparatus in operating condition. The circuit of the speed control motor connected to lead 71 is now closed at contacts 98 and 97. The holding clutch 95 of the signaling transmitter has been deenergized at contact 96 and the circuit of clutch 86 between the differential and the transmitter has been energized through contact 93. It will be noted that switch 79 controls contacts either in series or in parallel to the contacts controlled by switch 81 leading to the clutches 86 and 95 and the speed control motor circuit 71. The arrangement is such that the correct sequence of operation of these switches is essential to restore automatic operation and so that there will be no regulating action until the apparatus is in condition therefor. The extinguishing of red light 97' indicates to the operator that the apparatus is in operating condition. So long as the system frequency and the system speed of motor 40 remain at the correct desired value, the two parts of the rotary contact device will rotate together in the relation represented in Fig. 4. The speed of rotation of these parts and the spacing of fingers 56 and 57 from the snap switches 47 and 48 is such that only a very small integrated error in frequency is allowed before automatic operation starts. In apparatus which has been built and tested an integrated error of less than 1/20 of a cycle on a 60 cycle circuit corresponding to 1/300 of a second error in time has been detected and automatic operation initiated. The accuracy of the device in this respect can of course be varied as for example, by varying the spacing of the fingers 56 and 57 with respect to the snap switches 47 and 48. Let it be assumed now that the system frequency becomes slightly high. Finger 56 moves against snap switch 47 and closes the same. Within a two second interval the circuit of clutch 61 is closed at contact 74 by the 2-second interval device 75. When this happens control relay 67 is energized and closes the circuit of the speed control motor 70 (see Fig. 1) which starts operating to adjust the governor of the turbine in a direction to lower its speed. Simultaneously with this control operation, shaft 60 is driven at a slightly slower speed through clutch 61 at which time the friction clutch 45 slips. The changing speed of shaft 60 is ordinarily such under these conditions as to open switch 47 within a very short space of time, less than 2 seconds, and when this occurs coil 73 releases the armature carrying the movable contact of switch 74. A similar correcting impulse thus cannot be transmitted to the speed governor oftener than once in 2 seconds which has been estimated from experiments to be about the correct time for allowing the change of speed to be reflected back to the control apparatus and allow the apparatus to function without hunting. If, however, the change in speed is not sufficient, a second corrective impulse is transmitted during the next or some subsequent 2-second interval. The extent to which shaft 60 has been retarded from its normal speed by reason of the slip in clutch 45 is conveyed to the rotor element of the electric signaling transmitter 83 so that the station attendant may at all times have an indication which informs him in general of the departure of the station load from normal and the direction thereof. It will be apparent that the duration of the corrective impulses and the extent of movement of the signaling transmitter will vary with the magnitude of the error accumulated over a two second interval.

In case the over-speeding or under-speeding of the system is caused by some abnormal load condition which cannot ordinarily be taken care of by the automatic control affected by this apparatus, the finger 56 or 57 as the case may be will reach a point where it will open switch 49 or 50, in which case clutch 43 is deenergized interrupting automatic control and releasing armatures of switches 80 and 81 which move to the inactive positions represented in the drawings. Red light 97 comes on and the signaling transmitter is locked by clutch 95 in the position it was in when automatic operation was interrupted. It is intended that the control will be such that under ordinary operating conditions automatic operation will not be interrupted in this way.

A very important advantage of the speed control system as a whole over that of prior master clock control devices for the same general purpose is in the provision of the manually controlled speed changing device between the standard motor 13 and the shaft 32 of Fig. 1. It will be noted that by changing the gear ratio between these points by energizing one or the other of the magnetic clutches 36, 37 or 38, the standard speed used for comparison with the system speed may be temporarily and quickly changed by a definite amount in either direction without in any way disturbing the primary standard comprising the master clock 15. By thus modifying the comparing relationship between the standard and system frequencies emergency load conditions may be taken care of and load shifted from the station directly controlled to other stations and vice versa without interrupting automatic operation or disturbing any of the apparatus involved in such automatic operation.

Ordinarily, such operations as have just been referred to will produce a small time error in the system and in case the system is used for the distribution of time by means of synchronous motor driven clocks, the departure from correct system time should be kept track of and the correct time restored to the system as soon as convenient. To this end the master clock 15 is preferably provided with a hand 103 driven by a synchronous motor connected to the system as well as a hand 104 driven directly by the master clock itself. When the system time error is zero, these two hands are together. System time errors cause the hands to move apart in one direction or the other and by an extent determined by the direction and magnitude of the system time error. Such a clock is described in the Warren patent previously referred to. A circuit indicated at 102 in Fig. 1 is intended to represent the connection between the synchronous motor in the master clock and the system.

It is assumed that the station represented in Fig. 1 is a primary control station but is connected with other power generating stations through tie lines one of which is represented at 12. It is desirable to control such other stations from the primary station so as to control the tie line loads between the primary and other stations. Some of the stations may be water power stations at which the available water supply varies and some may be steam stations. The load on the territory supplied by the interconnected system may vary unequally in different localities. Thus, for the economical supply of the system load as a whole it is necessary to vary the tie line loads from time to time.

Fig. 5 represents one such power station which is connected to the station of Fig. 1 by the tie line 12. Automatic control apparatus for the station of Fig. 5 is provided which is controlled from the primary station of Fig. 1 in accordance with the primary standard of frequency as determined by the master clock 15 and in accordance with the load over tie line 12. At the station of Fig. 1 there is provided a motor-generator set 14—30 for generating a frequency of such a character that it may be efficiently transmitted to the station of Fig. 5 over a telephone circuit 31. The motor 14 is a synchronous motor supplied from the source of standard frequency and the generator 30 is a synchronous generator so that subject to modification as described below the frequency supplied to the distant power station over the circuit 31 is strictly proportional to the standard frequency used for controlling the primary station and is therefore the equivalent of the standard frequency. Located between motor 14 and generator 30 is a variable speed-gear drive in all respects similar to the gear drive arrangement between motor 13 and shaft 32, altho the exact gear ratios required may not be the same. The gear ratio is controlled by three magnetic clutches 105, 106, and 107 and it will be assumed that when clutch 106 is energized that generator 30 runs at the same speed as motor 14 which is the normal condition. When clutch 105 is energized generator 30 is driven at a slightly faster speed and when clutch 107 is energized generator 30 is driven at a slightly slower speed. In the present case, the circuit of the three clutches mentioned is controlled by a relay 108 which in turn is controlled by a contact making meter 109 which measures the load or current flowing in the tie line 12. The stationary contacts of meter 109 are preferably adjustable and it is assumed that the movable contact member of this meter may also be operated by hand in case it is desirable to use manual control instead of automatic control at this point. This meter may be adjusted so that when the load in the tie line 12 is flowing in the desired direction and in the desired amount, the movable contact member of meter 109 stands in a mid position so that both coils of the relay 108 are deenergized. At this time the armature of the relay is biased to a central position and closes the circuit of the magnetic clutch 106. It will be assumed that the load over the tie line is being supplied from the station of Fig. 1 to the station of Fig. 5. When this load increases a predetermined amount above normal or the desired value, meter 109 makes contact to energize the right hand coil of the relay thereby closing the circuit to magnetic clutch 105 and opening the circuit to magnetic clutch 106. Under these conditions the comparison frequency supplied by generator 30 to the distant power station is increased very slightly. When the tie line load is below normal or the desired value, the left hand coil of the relay 108 is energized thereby energizing clutch 107 in which case the comparison frequency supplied by generator 30 is decreased slightly below the normal value.

At the station of Fig. 5 I have represented a power generating unit 110 provided with automatic control apparatus substantially similar to that at the station of Fig. 1 and the corresponding parts of which are indicated by like reference characters. It will be noted that the system frequency of the station of Fig. 5 is compared through synchronous motor 40 to the frequency which is supplied to this station over the telephone circuit 31 through suitable amplifying apparatus supplying the synchronous motor 13. The speed comparing apparatus indicated by the box 29 may be similar to that already described in connection with Fig. 3. The shaft 32 of this apparatus is represented as driven directly by motor 13 instead of through a changed speed arrangement which is here ordinarily unnecessary.

It will be apparent that when the tie line load is high the speed of motor 13 will be increased slightly above normal by reason of the automatic tie line control apparatus at the station of Fig. 1, and this will result in increasing the speed of the power generating unit 110 until it is operating at full capacity or until the tie line load condition is corrected. It will be understood of course that the adjustments which are made in changing the load are very small momentary adjustments which merely advance or retard the phase angle of the alternating current generated by the controlled apparatus to the extent necessary for it to take the proper load. The system frequency of the station of Fig. 5 is thus compared to the standard frequency and this comparing relationship is modified automatically in accordance with changes in the tie line load. In case it is desired to temporarily control the tie line load manually, the movable contact member of relay 108 may be operated by hand. It will also be apparent that the tie line loads between the primary station and all other stations controlled as described above may be modified temporarily by manual control affected by switch 39 and that by this control device the time error in the entire system controlled may be adjusted.

In describing my invention I have illustrated and described in detail one form of mechanism by means of which the objects of the invention may be accomplished. It will be apparent to those skilled in the art that the details of construction of the control apparatus may be modified and other speed comparing or frequency comparing apparatus may be used in place thereof and still accomplish the same results. I, therefore, do not wish to limit my invention to the particular arrangement and apparatus as described, but seek claims commensurate with the true spirit and scope of my invention. Only one primary and one secondary control power station have been represented but it is contemplated that the power stations of the entire country or large sections thereof may be controlled by reference to the same standard frequency as a basis of comparison.

What I claim as new and desire to secure by Letters Patent of the United States, is:

1. In combination with alternating current power generating apparatus, means for controlling such apparatus comprising a source of standard frequency, means for comparing the standard frequency with the frequency of said power generating apparatus, control means responsive to the difference in frequency relation detected by said comparing means for correcting the frequency of the power generating apparatus, means operated with the control means for restoring the comparison means to a non-controlling condition and means for modifying the frequency comparison relationship of said apparatus.

2. In combination with alternating current power generating apparatus, means for controlling such apparatus comprising a source of standard frequency, means for comparing the standard frequency with the frequency of said power generating apparatus, control means responsive to a difference in frequency relation detected by said comparing means for correcting the frequency of the power generating apparatus, means for limiting the number of such correcting operations that can be made to not more than one in a given short interval of time, and means operated with the control means for restoring the comparison means to a non-controlling condition.

3. In combination with alternating current power generating apparatus, means for controlling said apparatus under normal load conditions, comprising a source of standard frequency, means for comparing the standard frequency with the frequency of the power generating apparatus, means responsive to a difference in frequency relation detected by said comparing means for correcting the frequency of the power generating apparatus, and means for rendering said control means inoperative in case the difference in frequency relation detected by said comparison means at any instant exceeds a predetermined amount.

4. In combination with alternating current power generating apparatus, means for controlling such apparatus, comprising a source of standard frequency, means for comparing the standard frequency with the frequency of said power generating apparatus, control means responsive to a difference in frequency relation detected by said comparing means for correcting the frequency of the power generating apparatus, means operated with said control means for restoring the comparing means to a non-regulating condition, means for limiting the number of such correcting operations that can be made to not more than one in a predetermined short interval of time, means for rendering the control means inoperative in case the difference in frequency relation detected by said comparison means at any one time exceeds a predetermined amount, and means for modifying the frequency comparing relationship of said apparatus.

5. In combination with alternating current power generating apparatus, means for use in controlling said apparatus comprising a source of standard frequency, a synchronous motor operated synchronously with the standard frequency, a synchronous motor operated synchronously with the frequency of said alternating current power generating apparatus, means for comparing the speeds of said synchronous motors and means located between one of said synchronous motors and the speed comparing means for modifying the speed comparing relation by a predetermined amount.

6. In combination with alternating current generating apparatus, means for use in controlling said apparatus comprising a source of standard frequency and means for comparing the standard frequency with the frequency of the alternating current generating apparatus, said comparing means including a pair of synchronous motors respectively operated in synchronism with the two frequencies, a contact controlling device having two parts respectively operated by said motors, speed regulating means for the generating apparatus controlled by said contact device for regulating the speed of the generating apparatus such that its frequency remains substantially proportional to the standard frequency for a given load, and means whereby the frequency comparing means may be adjusted so that the regulation effected thereby will maintain a different but proportional relationship between the compared frequencies.

7. In combination with alternating current power generating apparatus, a source of standard frequency which is independent of variations in the frequency of the power generating apparatus, means for comparing the standard frequency with the frequency of the generating apparatus, load control means for the generating apparatus operated in response to changes in the relation of the compared frequencies as determined by the comparing means and means responsive to the controlling action of said comparing means tending to restore it to a non-controlling condition after each controlling operation by an amount which is proportional to such controlling actions.

8. An alternating current power system comprising generating units connected together by a tie line, a source of standard frequency, means for obtaining a comparison between the frequency of one of said generating units and the standard frequency for regulating the power output of said unit, means for modifying the standard frequency in response to the tie line load, and means for comparing the modified frequency with that of the other generating unit for regulating the power output of such other unit.

9. In combination with first and second alternating current power generating units connected together by a tie line, means for controlling said power generating units so as to control the power in said tie line comprising a source of standard frequency, means for comparing said standard frequency with the frequency generated by the first power unit, means controlled by said comparing means for controlling the first power unit so as to maintain the relation between said compared frequencies substantially fixed, means supplied from the standard frequency source and controlled in response to the tie line load for providing a comparison frequency for the second power generating unit, means for comparing said comparison frequency with the frequency of said other generating unit, and means controlled by said last mentioned comparing means for controlling the second power unit so as to maintain the relation between the last mentioned frequencies substantially fixed.

10. The method of controlling load distribution between different alternating current power generating units of a power system supplied thereby which consists in providing a standard frequency system with which the frequencies of the different generating units of the power system may be compared, comparing the standard frequency with the frequency of the generating units, controlling the speed of the generating units in accordance with such comparison and modifying the comparison relation for different units to obtain the desired load distribution.

11. The method of controlling load distribution between different generating units of an alternating current distribution system interconnected by tie lines which consists in providing a standard frequency, comparing the standard frequency with the frequencies of the generating units, controlling the speed of the different generating units in accordance with such comparison, and modifying the comparison relation between different units in accordance with the tie line load.

12. The method of controlling the distribution of load supplied to an alternating current power system by a plurality of alternating current generating units which consists in providing a standard frequency, comparing the standard frequency with the frequencies of the different generating units, regulating the speed of the different generating units in accordance with such comparison and modifying the comparison relationship to adjust the phase angular relation existing between the different generating units.

13. The method of operating alternating current power generating apparatus, which consists in providing a standard frequency which is independent of the frequency of the generating apparatus, comparing the standard and generated frequencies, regulating the generating apparatus so as to maintain a predetermined relation between the standard and generated frequencies for a given load condition of the generating apparatus, and varying such relation for other load conditions.

CHARLES A. HOXIE.